US009969391B2

United States Patent
Kawakami et al.

(10) Patent No.: US 9,969,391 B2
(45) Date of Patent: May 15, 2018

(54) VEHICLE TRAVEL CONTROL APPARATUS

(71) Applicant: Hitachi Automotive Systems, Ltd., Hitachinaka-shi, Ibaraki (JP)

(72) Inventors: Tomonori Kawakami, Hitachinaka (JP); Atsushi Yokoyama, Tokyo (JP); Taisetsu Tanimichi, Hitachinaka (JP); Takaharu Abe, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 502 days.

(21) Appl. No.: 14/405,420

(22) PCT Filed: May 29, 2013

(86) PCT No.: PCT/JP2013/064825
§ 371 (c)(1),
(2) Date: Dec. 4, 2014

(87) PCT Pub. No.: WO2013/183502
PCT Pub. Date: Dec. 12, 2013

(65) Prior Publication Data
US 2015/0134168 A1 May 14, 2015

(30) Foreign Application Priority Data
Jun. 7, 2012 (JP) ................................. 2012-130228

(51) Int. Cl.
*B60W 30/14* (2006.01)
*B60W 20/00* (2016.01)
(Continued)

(52) U.S. Cl.
CPC ........... *B60W 30/143* (2013.01); *B60K 6/485* (2013.01); *B60K 6/54* (2013.01); *B60K 6/547* (2013.01);
(Continued)

(58) Field of Classification Search
CPC .......... B60K 6/485; B60K 6/54; B60K 6/547; B60K 2031/0091; B60W 10/06;
(Continued)

(56) References Cited

U.S. PATENT DOCUMENTS 6,882,909 B2 * 4/2005 Lee ........................ B60K 6/485
180/65.7
8,162,088 B2 * 4/2012 Haug .................... B60W 20/00
180/179
(Continued)

FOREIGN PATENT DOCUMENTS

JP 2003-146115 A 5/2003
JP 3456182 B2 10/2003
(Continued)

OTHER PUBLICATIONS

International Search Report (PCT/ISA/210) dated Jul. 2, 2013 with English-language translation (Two (2) pages).

*Primary Examiner* — Jerrah Edwards
(74) *Attorney, Agent, or Firm* — Crowell & Moring LLP

(57) ABSTRACT

A vehicle travel control apparatus is provided that is capable of improving fuel economy by exerting control so as to attain a specified speed without starting the engine during acceleration, and by increasing the regenerative energy recovery amount during deceleration, during the travel control. A vehicle travel control apparatus (100) to control the vehicle speed is mounted in a hybrid vehicle containing an engine (107) and a motor (112) as power sources, and includes: a target vehicle computing unit (200) that calculates a target vehicle speed; an acceleration command value calculation unit (201) that calculates an acceleration command value (211) based on a target vehicle speed; an acceleration limit processing unit (203) that calculates a post-limit acceleration command value (214) that limits the acceleration command value (211) by utilizing a specified (Continued)

upper-limit value and a specified lower-limit value; a torque command value computing unit (205) that calculates a torque command value from the post-limit acceleration command value (214); and a speed-change command value computing unit (206) that determines whether a down-shift is required or not based on the acceleration command value (211) and an upper-limit torque or a lower-limit torque of the motor, and calculates a speed-change command value (215).

6 Claims, 12 Drawing Sheets

(51) Int. Cl.
| | |
|---|---|
| *B60K 6/485* | (2007.10) |
| *B60W 10/08* | (2006.01) |
| *F02D 29/02* | (2006.01) |
| *F02D 17/04* | (2006.01) |
| *B60K 6/547* | (2007.10) |
| *B60W 10/11* | (2012.01) |
| *B60W 30/18* | (2012.01) |
| *B60W 20/30* | (2016.01) |
| *B60K 6/54* | (2007.10) |
| *B60W 10/06* | (2006.01) |
| *B60W 20/12* | (2016.01) |
| *B60K 31/00* | (2006.01) |

(52) U.S. Cl.
CPC ............ *B60W 10/06* (2013.01); *B60W 10/08* (2013.01); *B60W 10/11* (2013.01); *B60W 20/00* (2013.01); *B60W 20/12* (2016.01); *B60W 20/30* (2013.01); *B60W 30/18127* (2013.01); *F02D 17/04* (2013.01); *F02D 29/02* (2013.01); *B60K 2031/0091* (2013.01); *B60W 2510/244* (2013.01); *B60W 2550/402* (2013.01); *B60W 2710/083* (2013.01); *B60W 2710/1005* (2013.01); *B60W 2720/10* (2013.01); *B60W 2720/106* (2013.01); *Y02T 10/6226* (2013.01); *Y02T 10/6286* (2013.01)

(58) Field of Classification Search
CPC ...... B60W 10/08; B60W 10/11; B60W 20/00; B60W 20/12; B60W 20/30; B60W 30/143; B60W 30/18127; B60W 2510/244; B60W 2550/402; B60W 2710/083; B60W 2710/1005; B60W 2720/10; B60W 2720/106
See application file for complete search history.

(56) References Cited

U.S. PATENT DOCUMENTS

| 8,491,441 | B2* | 7/2013 | Fukitani | B60K 6/48 |
| | | | | 477/5 |
| 2004/0049328 | A1* | 3/2004 | Lee | B60K 6/485 |
| | | | | 701/22 |
| 2009/0321165 | A1* | 12/2009 | Haug | B60W 20/00 |
| | | | | 180/65.275 |
| 2011/0021312 | A1* | 1/2011 | Fukitani | B60K 6/48 |
| | | | | 477/5 |

FOREIGN PATENT DOCUMENTS

| JP | 4325626 B2 | 9/2009 |
| JP | 2010-285139 A | 12/2010 |

\* cited by examiner

FIG.6
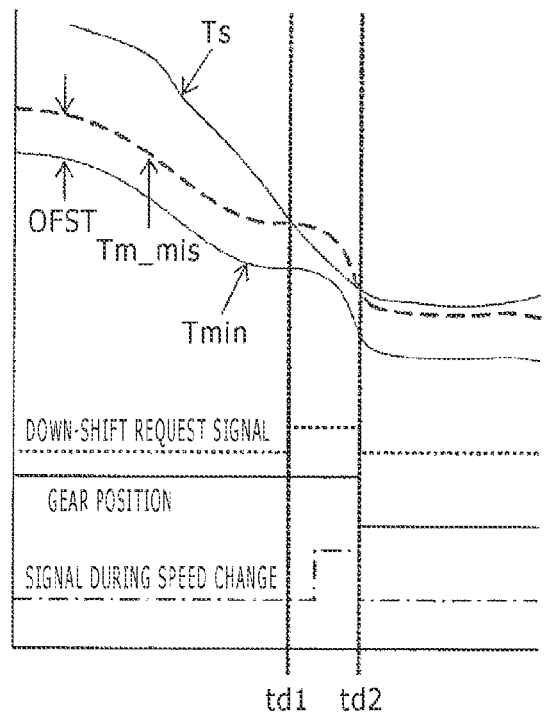
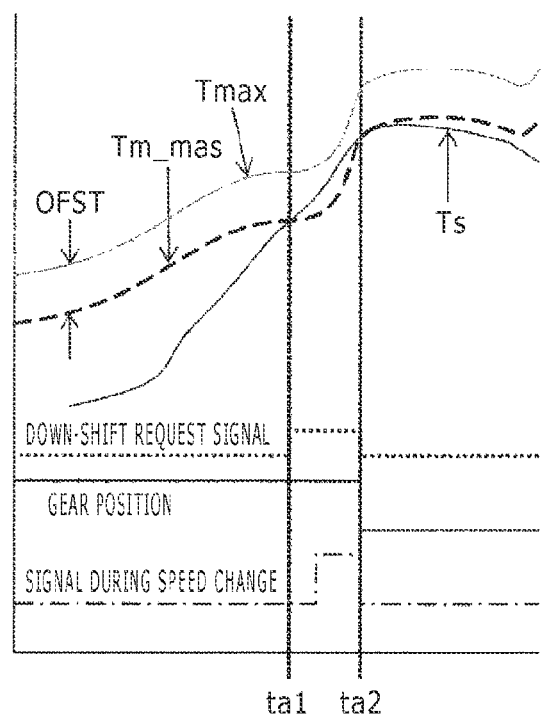

FIG.10
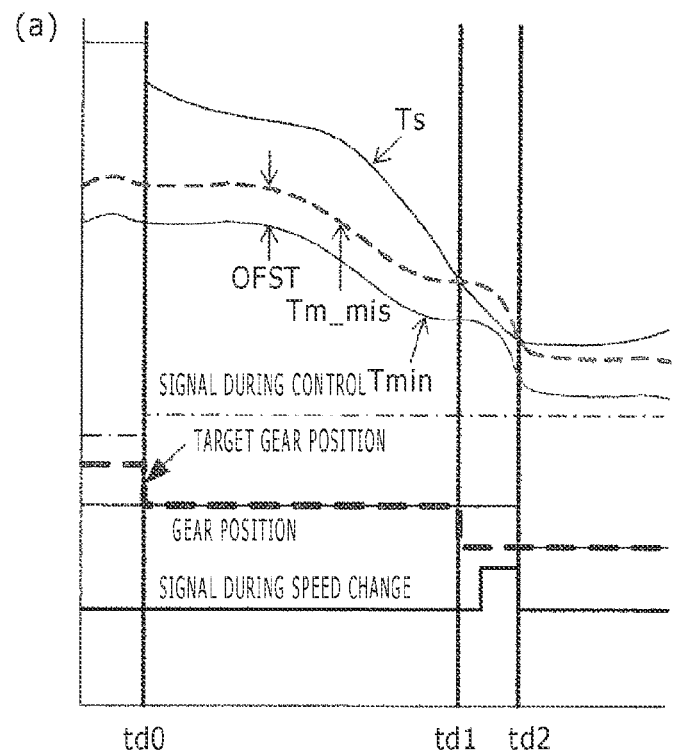
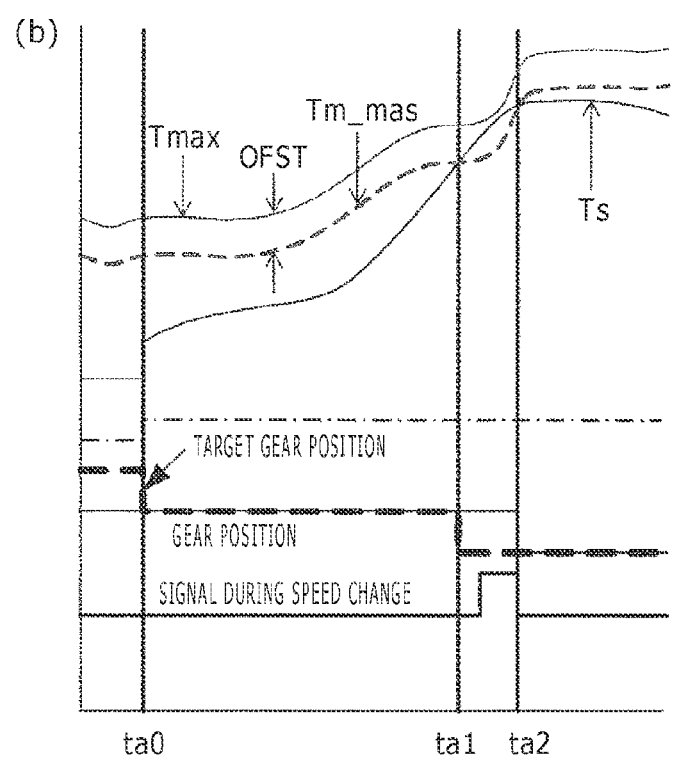

FIG. 12
(a)
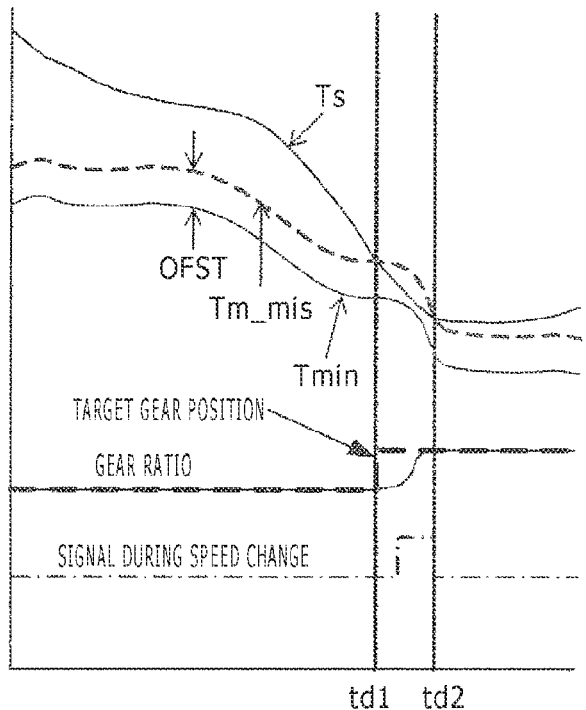
(b)
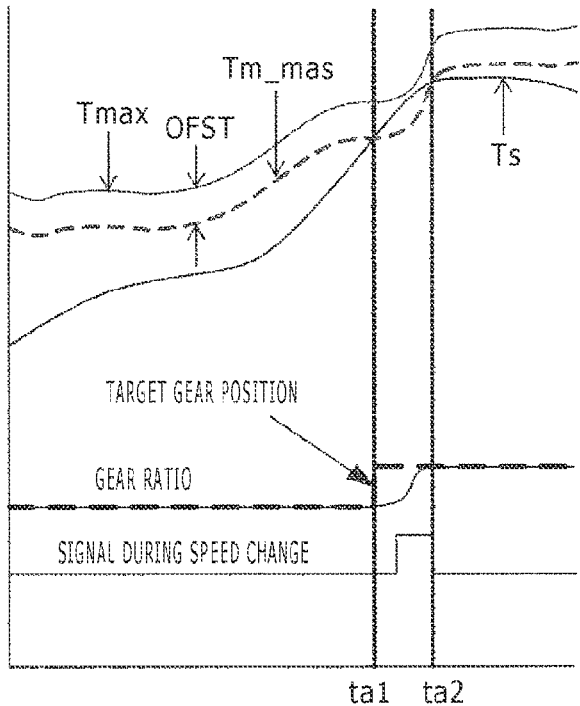

VEHICLE TRAVEL CONTROL APPARATUS

TECHNICAL FIELD

The present invention relates to a travel control apparatus for travel control of hybrid vehicles containing more than one power source.

BACKGROUND ART

Travel control apparatus mounted in vehicles are generally known in the related art that are capable of regulating their own vehicle speed to a specified speed based on data from SWs, external sensors, or navigation devices operated by the driver.

Moreover, hybrid vehicles utilizing both an engine and an electric motor as a power source, generate a braking force by operating an electric motor from the motive force of the drive wheel during vehicle e deceleration, and on the other hand perform regenerative braking utilizing the power generated by the electric motor as the regenerative energy. In this regenerative deceleration, regenerative coordinated braking is performed to adjust the deceleration occurring during friction braking by deducting the deceleration on occurring during regenerative deceleration from the amount of friction braking by the driver.

In such type of hybrid vehicles containing a travel control apparatus, a travel control apparatus is disclosed in Patent Literature 1 that controls the power source for quick acceleration during an increase in acceleration during travel control. A travel control apparatus is also described in Patent Literature 2 that improves the recovery rate of the regenerative energy during deceleration by stopping the regenerative coordinated braking during travel control, and achieving deceleration at the minimum torque that the motor can output.

CITATION LIST

Patent Literature

Patent literature 1: Japanese Patent No. 3456132
Patent literature 2: Japanese Patent No. 4325626

SUMMARY OF INVENTION

Technical Problem

The travel control apparatus disclosed in Patent Literature 1, consumes fuel by starting the engine to increase the torque generated by the power source in order to improve the follow-up until the vehicle reaches the specified speed.

Curing acceleration from the driver operating the accelerator pedal, the torque generated by the power source must be increased so that the driver experiences nothing wrong between the vehicle status and the amount of the accelerator pedal operation by the driver. However, preferably the vehicle is capable of reaching the specified vehicle speed by the certain level of acceleration during travel control without the driver operating the accelerator pedal.

In regenerative coordinated control on the other hand, the regenerative braking force is generally adjusted to a level equivalent to engine braking so that driver does not feel anything is wrong when releasing the accelerator pedal to reduce speed. However, the regenerative braking force can still be increased even assuming there is no adjusting in this way.

The travel control apparatus disclosed in Patent Literature 2 performs travel control without regenerative coordinated control and the deceleration capable of being generated is a deceleration generated according to the minimum torque of the motor. However, the deceleration timing might become delayed when the minimum torque is small and a large deceleration torque is required from the travel control apparatus, and therefore, if one is following a vehicle further ahead, one might approach too close to that vehicle.

However, the brake actuator for decelerating by operating the friction brake during travel control must have high durability and accuracy, responsiveness, and low noise so that the brake actuator is often expensive. Brake actuators that only perform sudden braking such as a collision damage minimizing brake (or collision avoidance system) are approximately the same cost as brake actuators for the VDC (Vehicle Dynamics Control (registered trademark)) or TCS (Traction Control System (registered trademark)), and ABS (Anti-lock Brake System) (registered trademark)).

Whereupon an object of the present invention is to provide a travel control apparatus capable of improving fuel efficiency by controlling the power source so as to accelerate to the specified speed without consuming fuel by starting the engine; and capable of improving fuel efficiency by improving the energy recovery amount when decelerating during travel control.

Solution to Problem

To achieve the aforementioned objectives, the present invention is a vehicle travel control apparatus that is mounted in a hybrid vehicle utilizing an engine and motor as power sources and controls its own vehicle speed, the vehicle travel control apparatus has the feature of including: a target vehicle speed computing unit that calculates a target vehicle speed; an acceleration command value calculation unit that calculates an acceleration command value based on the target vehicle speed; an acceleration limit processing unit that calculates a post-limit acceleration command value by limiting the acceleration command value by utilizing a specified acceleration upper-limit value and a specified acceleration lower-limit value; a torque command value computing unit that calculates a torque command value from the post-limit acceleration command value; and a speed-change command value computing unit that determines whether a down-shift is required or not based on the acceleration command value and an upper-limit torque or a lower-limit torque of the motor, and calculates a speed-change command value.

Advantageous Effects of Invention

The vehicle travel control apparatus of the present invention is capable of reducing fuel consumption by delaying or not starting the engine during acceleration; and is capable of improving fuel efficiency by increasing the regenerative energy recovery amount by causing deceleration by regenerative deceleration when slowing down.

BRIEF DESCRIPTION OF DRAWINGS

FIG. 6 are timing charts for the down-shift request decision processing, in which (a) is a graph showing the operation during deceleration, and (b) is a graph showing the operation during acceleration.

FIG. 10 are timing charts of the down-shift request decision processing, in which (a) is a drawing showing the operation during deceleration, and (b) is a drawing showing the operation during acceleration.

FIG. 12 are timing charts of the down-shift request decision processing, in which (a) is a drawing showing the operation during deceleration, and (b) is a drawing showing the operation during acceleration.

DESCRIPTION OF EMBODIMENTS

Figure 1:
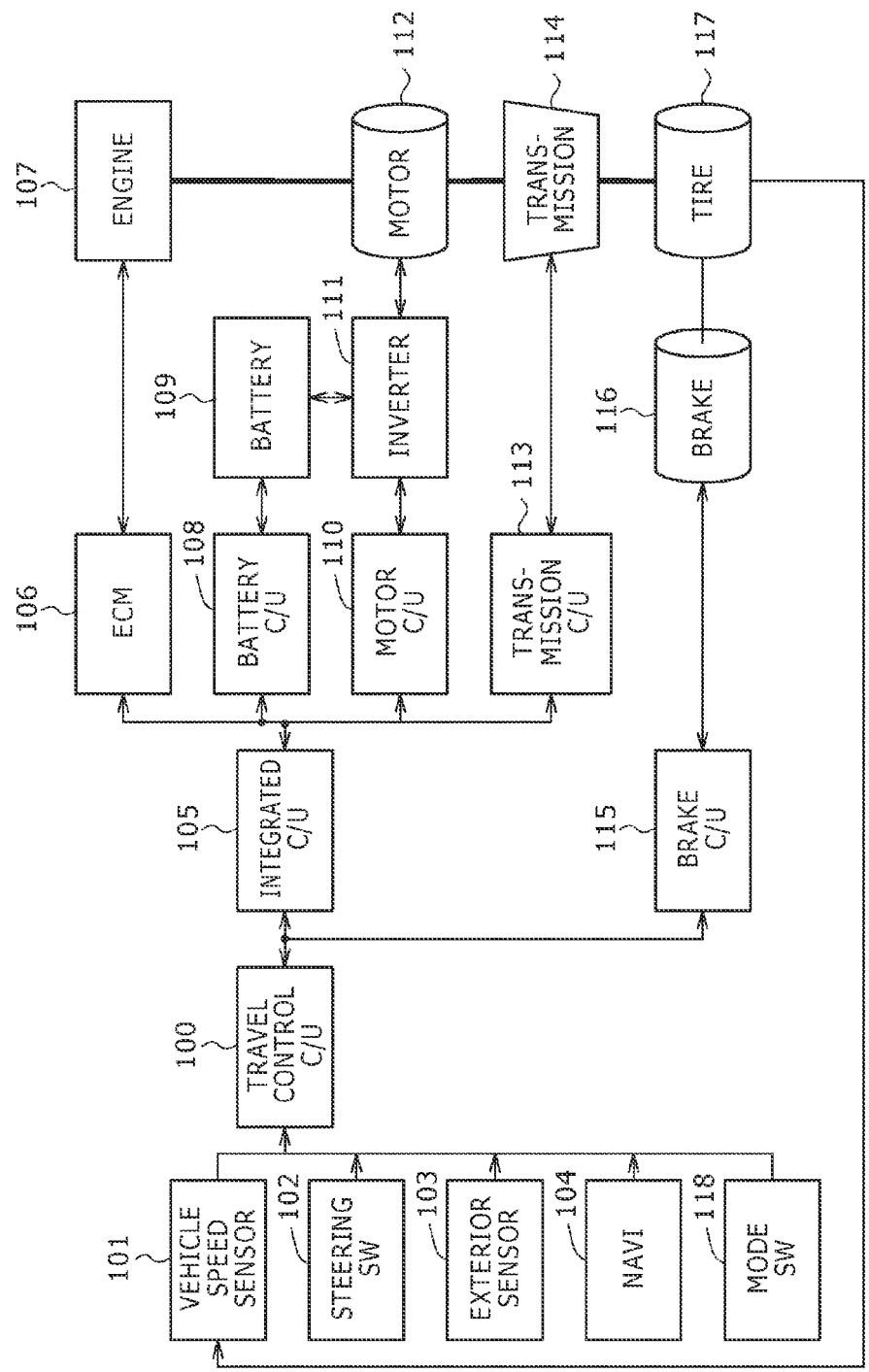
FIG. 1 is a block diagram showing an overall structural view of the vehicle itself.

The embodiments of the vehicle travel control apparatus of the present invention are described next while referring to the drawings. The vehicle for mounting the travel control apparatus of the present invention is a hybrid vehicle. The control unit in each drawing is shown by the notation C/U.

First Embodiment of the Travel Control Apparatus

The vehicle travel control apparatus of the first embodiment of the present invention is described next while referring to FIG. 1 through FIG. 7.

<Structure of the Travel Control Apparatus>

FIG. 1 is a block diagram showing an overall structural view of the vehicle in which the vehicle travel control apparatus of the present invention is mounted.

As shown in this figure, the vehicle serving as the hybrid vehicle includes a travel control unit 100 (travel control apparatus), a vehicle speed sensor 101 to measure the speed of the vehicle, a steering SW 102 to express the driver's acceleration intent and the deceleration intent, an exterior sensor 103 to measure the distance or the relative speed to surrounding objects, a navigation device 104 including a communicator capable of acquiring map information and road information and signal information, and a mode SW 108 capable of switching the travel modes.

The hybrid vehicle contains a structure serially joining in order from the power source upstream side: an engine 107, a motor 112 and a transmission 114. The output from the transmission 114 is provided to the tires 117 from a propeller shaft and differential gear, and driveshaft, not shown in the drawing.

The hybrid vehicle further includes a brake control unit 115 and brake 116 for operating the VDC (Vehicle Dynamics Control (registered trademark)), the TCS (Traction Control System (registered trademark)), or the ABS (Anti-lock Brake System) (registered trademark)).

The brake control unit 115 is capable of operating the collision damage minimizing brake (or collision avoidance system) by a command from the travel control unit 100.

The engine 107 is an internal combustion engine such as a gasoline engine, a diesel engine, or a hydrogen engine that is controlled by an engine control module 106 (ECM).

An inverter 111 to generate control current is coupled to the motor 112, and the inverter 111 is coupled to a battery 109.

In addition to operating as an electric motor by way of the electrical power from the battery 109, the motor 112 contains a structure allowing operation as an electric generator.

The motor control unit 110 generates a control current in the inverter 111, and controls driving of the motor 112 by applying a control current to the motor 112.

The battery 109 contains a battery control unit 108 for monitoring the charging state of the battery 109.

The transmission 114 is a transmission that switches the stepped or non-stepped gear ratio according to the degree of the accelerator opening or the vehicle speed and is drive-controlled by the transmission control unit 113.

The hybrid vehicle further contains an integrated control unit 105 that implements control so as to optimize the energy that the vehicle itself consumes. The integrated control unit 105 105 stops regenerative coordinated control when a travel control in-progress signal is received from the travel control unit 100, and can perform control to reduce the SOC value (State of Charge) to a specified value so as to input the electrical power that is generated during regenerative deceleration when a SOC value reduction request signal is received. Moreover, when a torque command signal is received, a torque suitable to this torque command value is output by controlling the engine and motor, and if an engine stop possibility signal is received, the integrated control unit 105 105 can control the engine control module 106 to stop the engine, and if a down-shift request signal is received the integrated control unit 105 105 can control the transmission control unit 113 to perform down-shifting.

The above-described control unit is coupled by way of CAN to allow data communication.

The processing block configuration for the travel control apparatus is described next.

<Processing Block for Travel Control Apparatus>

Figure 2:
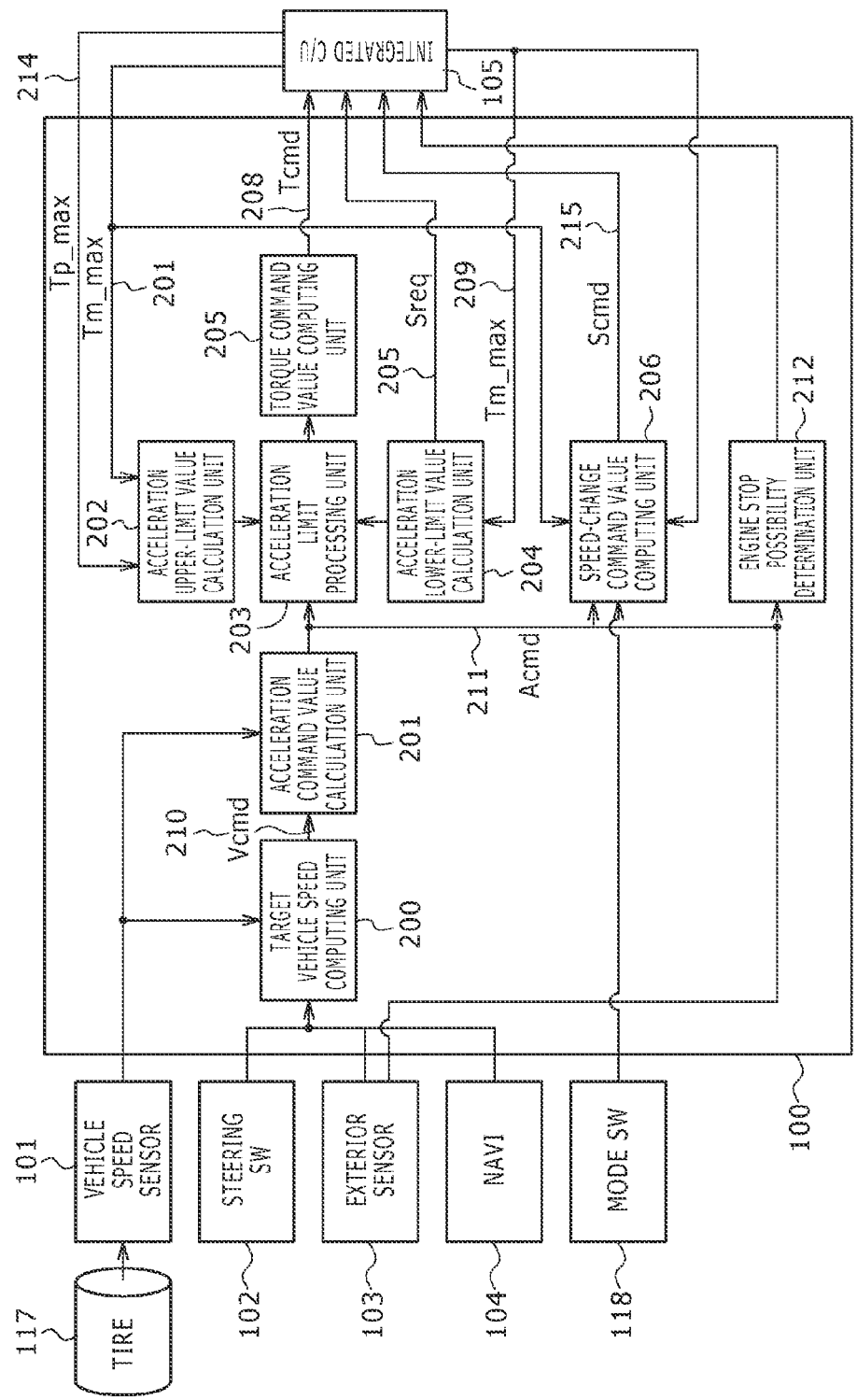
FIG. 2 is a block diagram of the process of the first embodiment for the travel control apparatus of the present invention.

FIG. 2 is a block diagram of the process for the travel control unit of the present embodiment.

The travel control unit 100 includes a target vehicle speed computing unit 200, an acceleration command value calculation unit 201, an acceleration limit processing unit 203, an acceleration upper-limit value calculation unit 202, an acceleration lower-limit value calculation unit 204, a torque command value computing unit 205, a speed-change command value computing unit 206 to calculate a down-shift request value Scmd 215, and an engine stop possibility determination unit 212 to process the engine stop possibility signal.

The target vehicle speed computing unit 200 calculates a target vehicle speed Vcmd 210 for executing travel control, based on the vehicle speed that is measured by the vehicle speed sensor 101 and information transmitted from the steering SW 102 for expressing the driver's acceleration intent and the deceleration intent, the exterior sensor 103 that measures the distance or the relative speed to surrounding objects, and the navigation device 104 for acquiring map information.

The acceleration command value calculation unit 201 calculates an acceleration command value Acmd for setting the current vehicle speed to a target vehicle speed based on the vehicle speed that is measured by the vehicle speed sensor 101, and the target vehicle speed Vcmd 210 that is calculated in the target vehicle speed computing unit 200.

The operating principle and the method for calculating the target vehicle speed Vcmd and the acceleration command value Acmd are based on the operating principle and calculation methods in the known art and therefore their detailed description is omitted.

The acceleration upper-limit value calculation unit 202 calculates the acceleration upper-limit value Aulmt 212 from the gear ratio of the transmission 114 and the output upper-limit torque from the power source. The processing flow in the acceleration upper-limit value calculation unit 202 is described next.

The processing flow in the acceleration upper-limit value calculation unit 202 is described next.

<Processing Flow of Acceleration Upper-Limit Value Calculation Unit>

Figure 3:
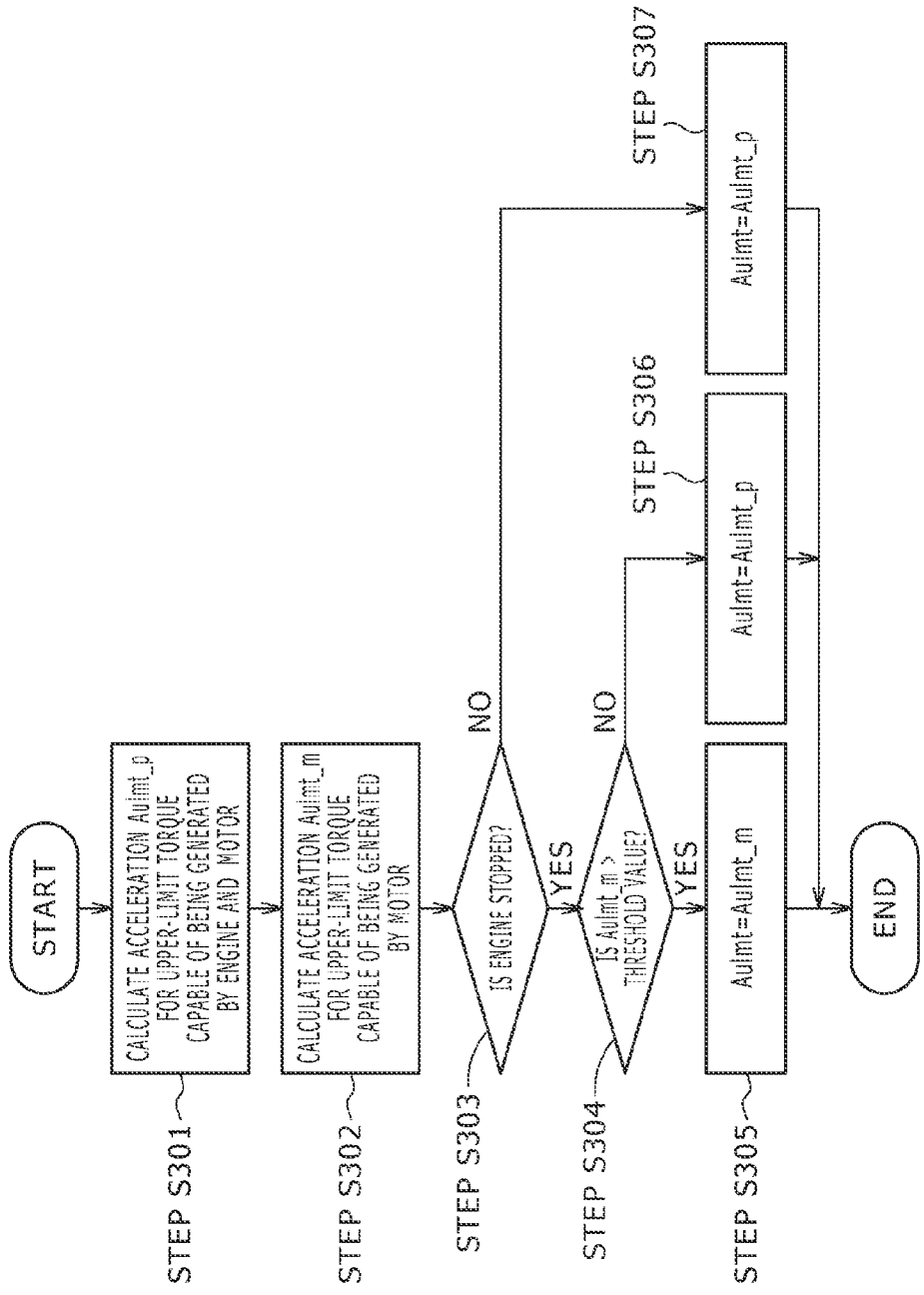
FIG. 3 is a flow chart of the process for calculating the acceleration upper-limit value.

FIG. 3 is a flowchart showing the acceleration upper-limit value calculation process.

In step S301, the upper-limit torque Tp_max capable of being generated from a combination of the engine and the motor is converted to the acceleration Aulmt_p.

Next, in step S302, the value Tmax that is the motor output upper-limit torque Tm_max 207 converted into the transmission end torque, is further converted into the acceleration Aulmt_m.

Next, in step S303, a decision is made on whether the engine is stopped or not, and when the engine is stopped, the processing proceeds to step S304 and a decision is made on whether or not the acceleration Aulmt_m converted from the motor output upper-limit torque is larger than a specified threshold value. The value of this threshold is determined by the vehicle speed, gear ratio or gear position, the presence of a car in front, and the road conditions or may be set as preferred by the driver.

When the acceleration Aulmt_m is larger than a specified threshold value, the acceleration upper-limit value Aulmt is set as the acceleration Aulmt_m that is converted from the motor output upper-limit torque (step S305).

When the acceleration Aulmt_m is below a specified threshold value, the acceleration Aulmt_p that is converted from the upper-limit torque Tp_max capable of being generated from the engine and the motor is converted to the acceleration upper-limit value Aulmt (step S306).

When determined in step S303 that the engine is not stopped, the same processing as in the above-described method is performed (step S307).

Starting the engine can prevent the problem from the above-described acceleration upper-limit value calculation process when implementing travel control using the motor, namely the problem that when the driver operates the switch to accelerate, the acceleration is had because the acceleration generated by the motor is small and so feels wrong to the driver.

The processing flow in the acceleration lower-limit value calculation unit 204 is described next.

<Processing Flow in the Acceleration Lower-Limit Calculation Unit>

The acceleration lower-limit value calculation unit 204 calculates the value Tmin so that the motor output lower-limit torque Tm_min 209 is converted to the transmission end torque, and the acceleration lower-limit value Adlmt from the gear ratio of the transmission 114, and if the acceleration lower-limit value Adlmt is larger than the threshold value, assumes that deceleration is inadequate and makes a SOC value reduction request decision.

Figure 4:
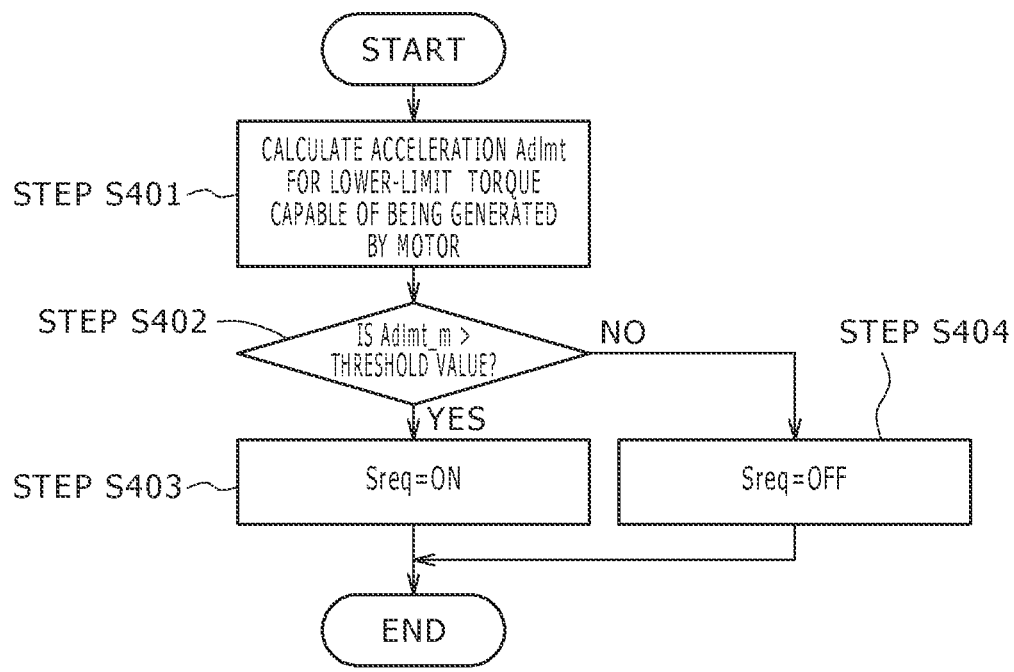
FIG. 4 is a flow chart of the process for calculating the acceleration lower-limit value.

FIG. 4 is a flow chart of the acceleration lower-limit calculation processing. In step S401, a value that is the motor output lower-limit torque Tm_min 209 is converted into a transmission end torque that is further converted to the acceleration lower-limit value Adlmt.

Next, in step S402, a decision is made on whether or not the acceleration lower-limit value Adlmt is larger than the threshold value. This threshold value is calculated by adding a value that takes into account the time to reduce the SOC value to a specified value relative to the value-determined by the vehicle speed, gear ratio or gear position, the presence of a car in front, and the road conditions, etc.

When the Adlmt is larger than a specified threshold value, the SOC value reduction request signal Sreq is turned ON (step S403).

However, when the Adlmt is smaller than a specified threshold value, the SOC value reduction request signal Sreq is turned OFF (step S404).

<Method for Converting Motor Torque to Transmission End Torque>

The following formula 1 is applied when converting motor torque to transmission end torque.

$$\text{Transmission end torque} = \text{motor torque} \times \text{gear ratio} \times \text{torque ratio} \times \text{gear efficiency} \quad \text{[Formula 1]}$$

The following formula 2 is applied when converting the output upper-limit torque and output lower-limit torque to acceleration.

$$\text{Acceleration} = ((\text{output torque} \times \text{differential gear ratio}) / (\text{vehicle weight} \times \text{tire radius})) - \text{travel resistance} \quad \text{[Formula 2]}$$

Here the gear efficiency is the transmission efficiency of the transmission 114. The torque ratio is the ratio of the output torque to the input torque when using a torque converter. Further, the travel resistance is the value from converting the resistive force formed while the vehicle is traveling to acceleration and is a value found according to the vehicle speed.

The acceleration limit processing unit 203 limits the upper-limit of the acceleration command value Acmd calculated by the acceleration command value calculation unit 201, with the acceleration upper-limit value Aulmt calculated by the acceleration upper-limit value calculation unit 202. The acceleration limit processing unit 203 also limits the lower-limit of the acceleration command value Acmd with the acceleration lower-limit value Adlmt, and calculates the post-limit acceleration command value Tp_max 214.

The torque command value computing unit 205 calculates the torque command value Tcmd 208 from the post-limit acceleration command value Tp_max 214.

The following formula 3 is applied to calculate the torque command value of the transmission end when converting the acceleration into a torque command value.

$$\text{Torque command value} = ((\text{acceleration} + \text{travel resistance}) \times \text{vehicle weight} \times \text{tire radius}) / \text{differential gear ratio} \quad \text{[Formula 3]}$$

Travel control is implemented by transmitting the torque command value Tcmd 208 to the integrated control unit 105.

To accelerate during travel control, the travel control is implemented below the upper-limit torque of the power source while the engine is running; and the torque command value Tcmd is limited by the motor upper-limit torque while e the engine is stopped, so that the vehicle can accelerate with only the motor as the power source without starting the engine.

To decelerate during travel control, the integrated control unit 105 is structured not to perform regenerative coordinated control during travel control so that travel control can function at above the lower-limit torque capable of being generated by the motor.

When the mode SW is set to fuel saving mode, the speed-change command value computing unit 206 calculates the speed-change command value Scmd 215 while the engine is stopped by utilizing the acceleration command value Acmd 211, the motor output upper-limit torque Tm_max 207, and the motor output lower-limit torque Tm_min 209.

The processing flow in the speed-change command value computing unit 206 is described next.

<Processing Flow for the Speed-Change Command Value Scmd>

Figure 5:
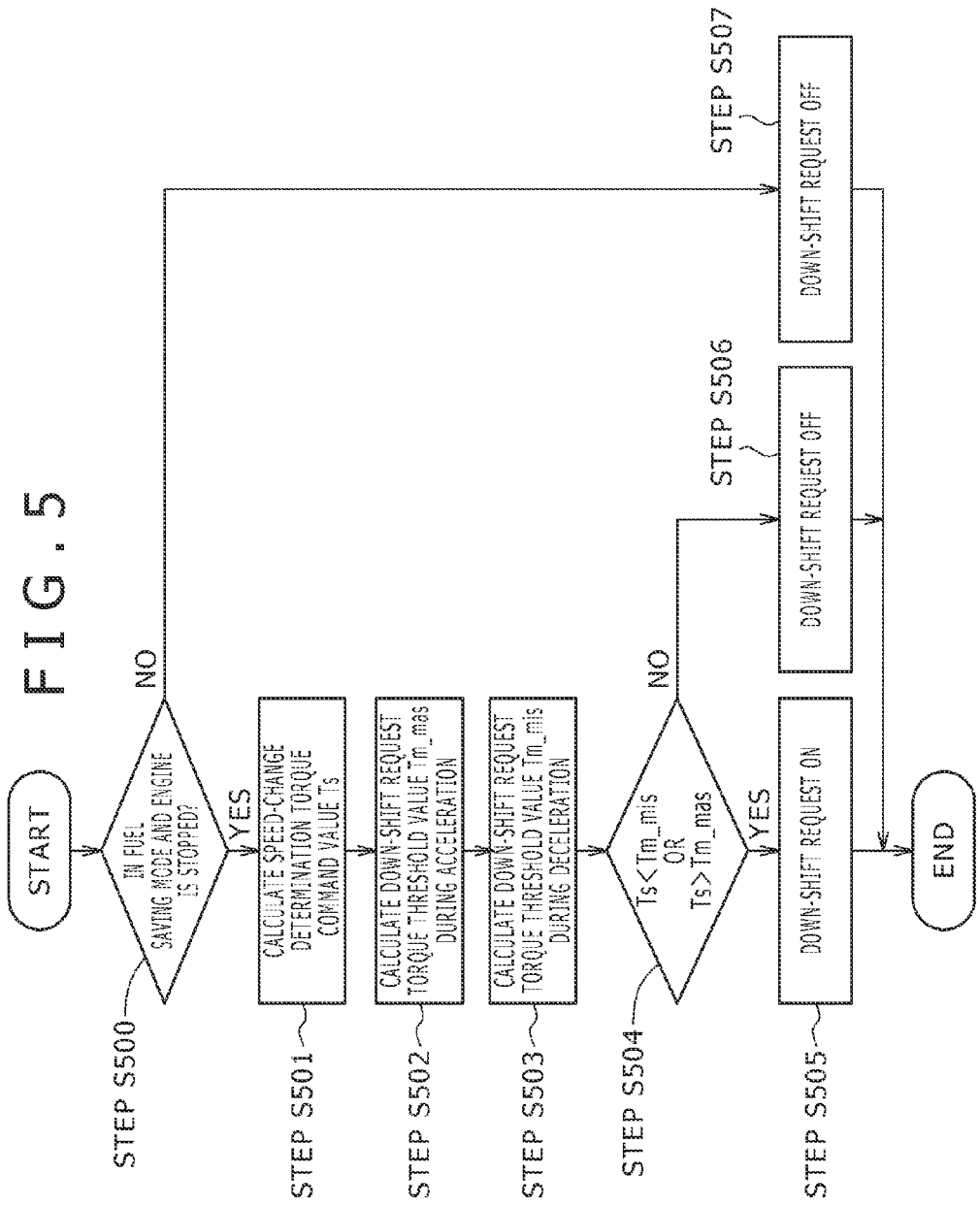
FIG. 5 is a flow chart of the down-shift request decision processing.

FIG. 5 is the processing flow for the speed-change command value Scmd.

First of all, in step S500, a decision is made whether in fuel saving mode and the engine is stopped or not.

In step S501, if in fuel saving mode and the engine is stopped, the speed-change torque command value Ts is calculated in formula 3 by utilizing the acceleration command value Acmd 211.

To determine that the engine is stopped, a decision is made as to whether the engine is stopped or not based on an engine rotation speed that is 0 and also a cranking signal that is OFF before engine start.

Next, the down-shift request torque threshold value Tm_mas during acceleration, and the down-shift request torque threshold value Tm_mis during deceleration are respectively calculated in step S502 and step S503.

The down-shift request torque threshold value Tm_mas during acceleration is converted to the transmission end torque by utilizing the motor output upper-limit torque Tm_max 207 and the gear ratio of the transmission 114, and a specified offset value for the speed change time portion is added as shown in the following Formula 4.

$$Tm\_mas = Tm\_max \times \text{gear ratio} \times \text{gear efficiency} \times \text{torque ratio} - \text{offset value}$$ [Formula 4]

The down-shift request torque threshold value Tm_mis during deceleration on the other hand, is obtained by conversion to the transmission end torque by utilizing the motor output lower-limit torque Tm_min 209 and the gear ratio for the transmission 114, and a specified offset value for the speed change time portion is added as shown in the following Formula 5.

$$Tm\_mis = Tm\_min \times \text{gear ratio} \times \text{gear efficiency} \times \text{torque ratio} + \text{offset value}$$ [Formula 5]

Next, the speed-change torque command value Ts and down-shift request torque threshold value Tm_mas and Tm_mis are compared, and an ON or OFF decision is made for the down-shift request signal.

In step S504, the down-shift request signal is set to ON (step S505), when the speed-change torque command value Ts is smaller than Tm_mis, or Ts is larger than Tm_mas. In all other cases the down-shift request signal is set to OFF (step S506).

In step S500, if not in fuel saving mode, or when determined that the engine is rotating, the shift-down request signal is set to OFF (step S507).

The operation of the speed-change command value computing unit 206 is described next.

<Operation of Speed-Change Command Value Computing Unit>

FIG. 6 are timing charts of the down-shift request processing.

FIG. 6(a) shows the operation during deceleration.

In the figure, Tmin is a value which is the motor output lower-limit torque Tm_min 209 that is converted to the transmission end torque by utilizing formula 1, and that value added with a specified offset is Tm_mis.

In the deceleration during travel control, the speed-change torque command value is gradually becomes smaller, Ts becomes less than Tm_mis (Ts<Tm_mis) at time td1, and the down-shift request signal turns ON. Thereafter, the transmission speed changes, and Tm_mis becomes small as the gear moves lower so that Ts>Tm_mis and the down-shift request signal turns OFF.

FIG. 6(b) on the other hand shows the operation during acceleration.

In the figure, Tmax is the value which is the motor output upper-limit torque Tm_max 207 that is converted into the transmission end torque by utilizing the formula 1, and that value added with a specified offset is Tm_mas.

In the acceleration during travel control, the speed-change torque command value Ts gradually becomes larger, Ts>Tm_mas at time ta1, and the down-shift request signal turns ON. Thereafter, the transmission speed changes, and Tm_mas becomes large as the gear moves lower so that Ts<Tm_mas and the down-shift request signal turns OFF.

The engine stop possibility determination unit 212 utilizes the information from the external sensors and the navigation device and further uses the acceleration command value Acmd 211 to determine a timing not requiring acceleration, and outputs an engine stop possibility decision signal.

The processing flow in the engine stop possibility determination unit 212 is described next.

<Calculating the Flow in the Engine Stop Possibility Determination Unit>

Figure 7:
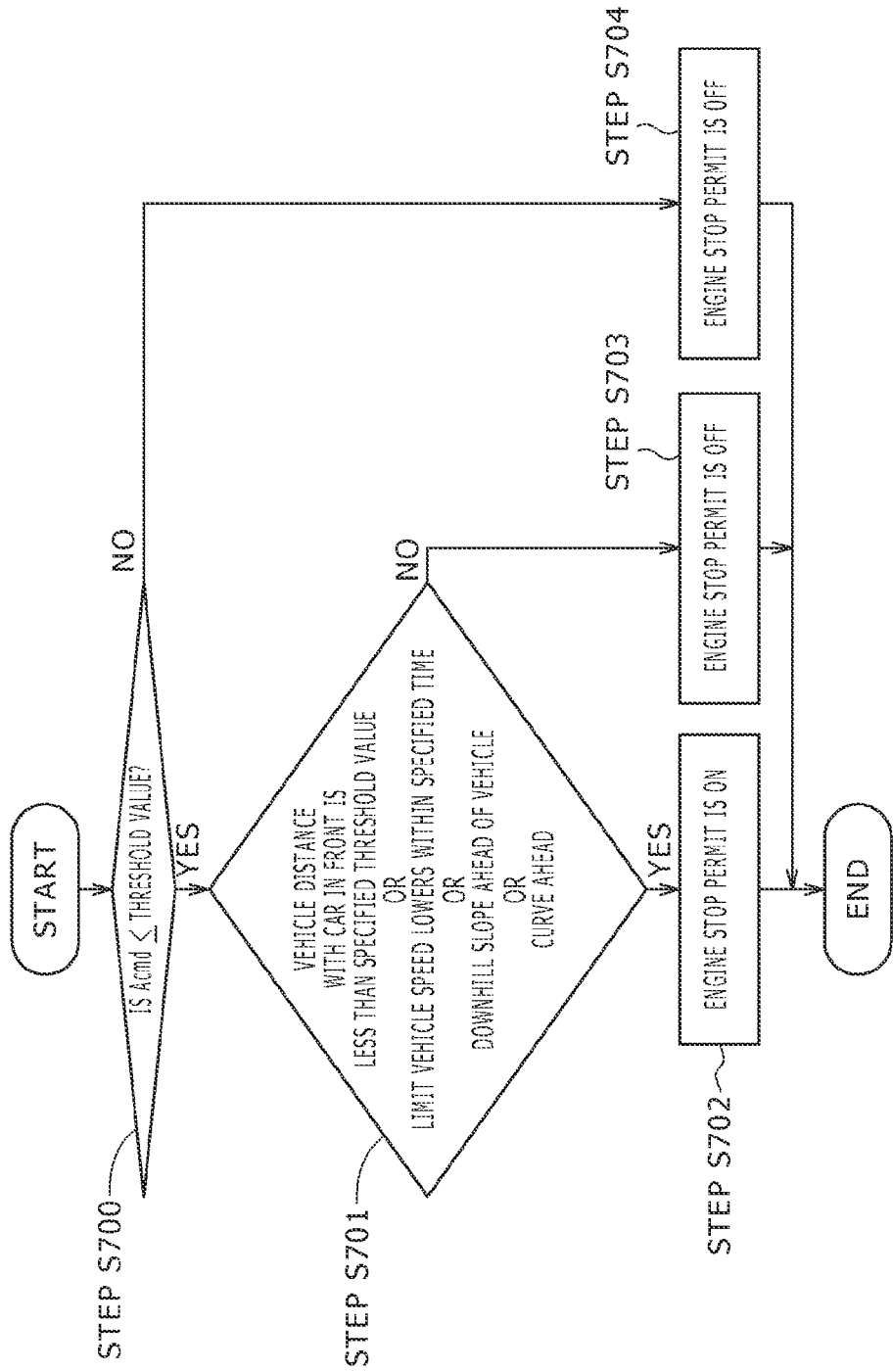
FIG. 7 is a flow chart of the engine stop permit decision process.

FIG. 7 is a flow chart for describing the engine stop permit decision processing in the engine stop possibility determination unit.

First of all, in step S700, a decision is made whether the acceleration command value Acmd is less than the specified acceleration threshold value, and if less than the specified acceleration threshold value, a decision is made in step S701 whether acceleration is not needed.

Acceleration is judged as not needed when the distance between the car ahead is smaller than a threshold distance that is found by a specified calculation method, when less than the limit vehicle speed within a specified time, or when there is a downhill slope in the forward direction of travel or when there is a curve ahead.

When there is a decision that acceleration is not necessary, the engine stop permit signal turns ON in step S702.

When a decision is made in step S700, S701 that acceleration or acceleration is required, the engine stop permit signal turns OFF (step S703, step S704).

In this way, the travel control unit 100 utilizes the transmission end torque to decide the command values from here and the down-shift command values. However, the decision may also be made by utilizing the crankshaft end torque or the drive power. Filter processing may also be applied in order to remove high-frequency components from the torque that is utilized to make she decision.

A down-shift request decision is made here only when the mode SW is in fuel saving mode. However, a structure where the mode SW is eliminated and there is constant down-shift control may be utilized.

The control units are coupled by way of CAN. However, a change may be made to another method allowing data communication by way of all or a portion of the couplings.

Moreover, the engine can be stopped at a timing that is determined not to require acceleration during travel control, the upper-limit torque of the motor can be output as the upper-limit value of the torque command value when accelerating while the engine is stopped, and when acceleration is insufficient, down-shifting can be performed so that fuel consumption can be suppressed by accelerating without starting the engine.

Also, the engine can be started to accelerate when determined that the acceleration during down shifting is inadequate and might feel wrong to the driver.

When decelerating, the regenerative coordinated control can be stopped and the lower limit torque of the of can be output as the lower limit value of the torque command value, and down-shifting is performed if the driver feels deceleration is insufficient, and the recovery rate of energy can be increased by performing deceleration by regenerative deceleration.

Also, there is no usage of the brake to control the speed during travel control so that the durability request specifications of the brake actuator can be lowered to keep the cost low.

Second Embodiment of the Travel Control Apparatus

The first embodiment of the travel control apparatus limits the acceleration while the engine is stopped by utilizing the upper-limit torque and lower-limit torque of the motor.

A travel control unit 100A (travel control apparatus) in the second embodiment, on the other hand, controls the acceleration by finding the upper-limit torque and the lower-limit torque according to the SOC value.

When the SOC value is high, there is a large amount of power output from the battery but on the other hand the amount of regenerative power that can input becomes small.

Conversely, when the SOC value is low, the power output from the battery becomes small and the amount of regenerative power that can input becomes large.

The upper-limit value of the motor torque therefore become larger and the acceleration that is generated also becomes larger when the SOC value is large; and the upper-limit of the motor torque becomes small and the acceleration that is generated also becomes small when the SOC value is small.

When the SOC value is large, the lower-limit value of the motor torque is large (approaches zero), and the acceleration that is generated also becomes large (approaches zero); and when the SOC value is small, the lower-limit value of the motor torque is small, and the acceleration that is generated also becomes small.

Figure 8:
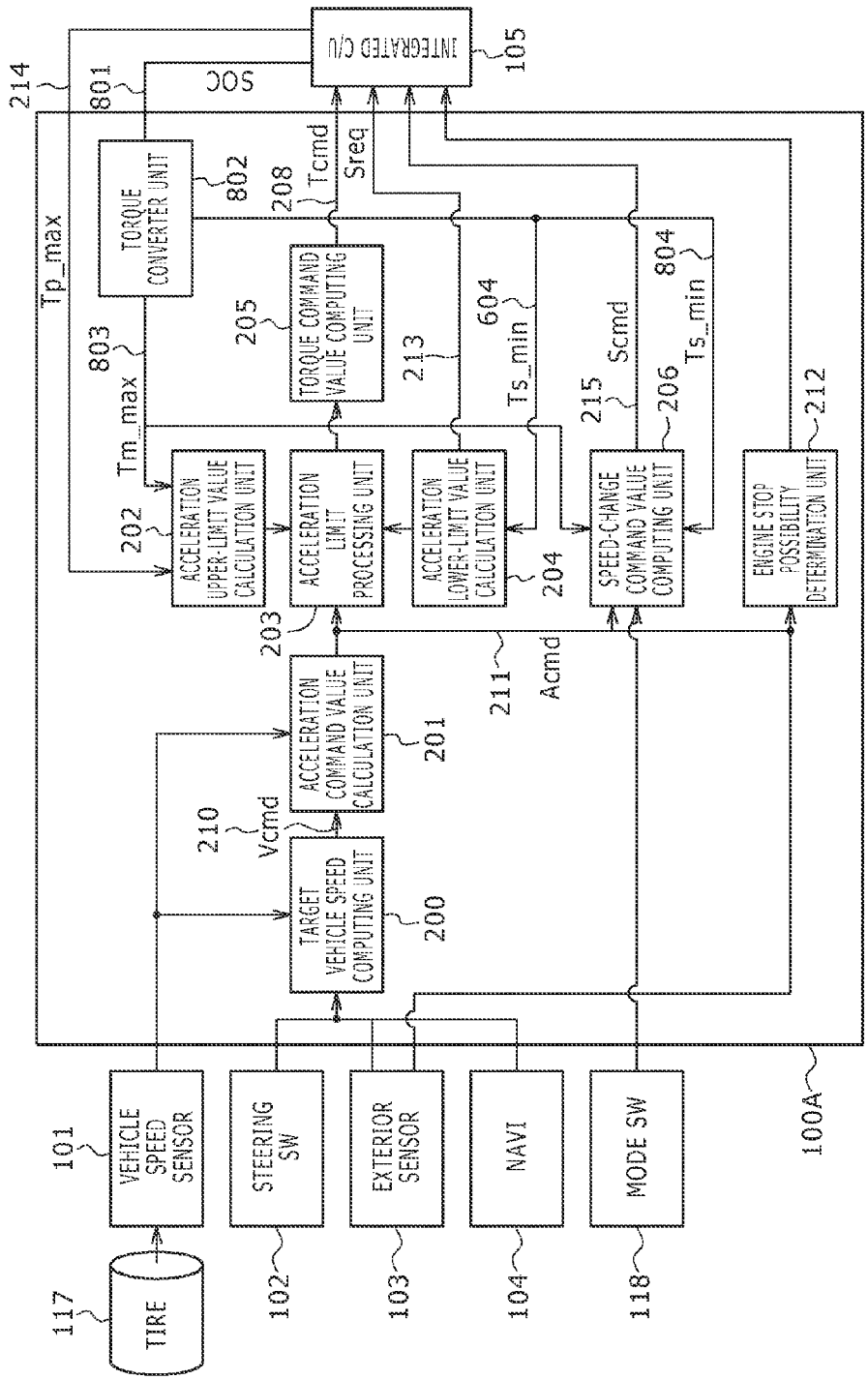
FIG. 8 is a block diagram of the processing of the second embodiment for the travel control apparatus of the present invention.

FIG. 8 is a block diagram of the process of the second embodiment for the travel control apparatus of the present invention.

The travel control unit 100A receives the SOC value 801 from the integrated control unit 105, converts the SOC value into an upper-limit torque Ts_max and lower-limit torque Ts_min in the torque converter unit 802, and inputs them instead of Tm_max and Tm_min into the acceleration upper-limit value calculation unit 202, the acceleration lower-limit value calculation unit 204, and the speed-change command value computing unit 206.

The SOC value is converted, into a torque here but the upper-limit torque and the lower-limit torque may be found from any or all of the motor rotation speed, motor temperature, or battery temperature.

The travel control unit 100A can stop the engine at a timing that is determined as not requiring acceleration during travel control, and can perform travel control by way of the acceleration upper-limit value and acceleration lower-limit value according to the upper-limit torque and lower-limit torque corresponding to the SOC value.

Third Embodiment of the Travel Control Apparatus

The travel control apparatus of the first and second embodiments performs travel control by outputting a down-shift signal from the speed-change command value computing unit of the travel control unit 100, 100A when acceleration or deceleration are inadequate. However, the present embodiment implements control by outputting a gear position signal from the speed-change command value computing unit. The transmission control unit 113 is configured so as to change the gear position when a gear position signal is received from the travel control unit 100.

The processing flow for finding the gear position command value is described next.

<Processing Flow for Finding the Gear Position Command Value>

Figure 9:
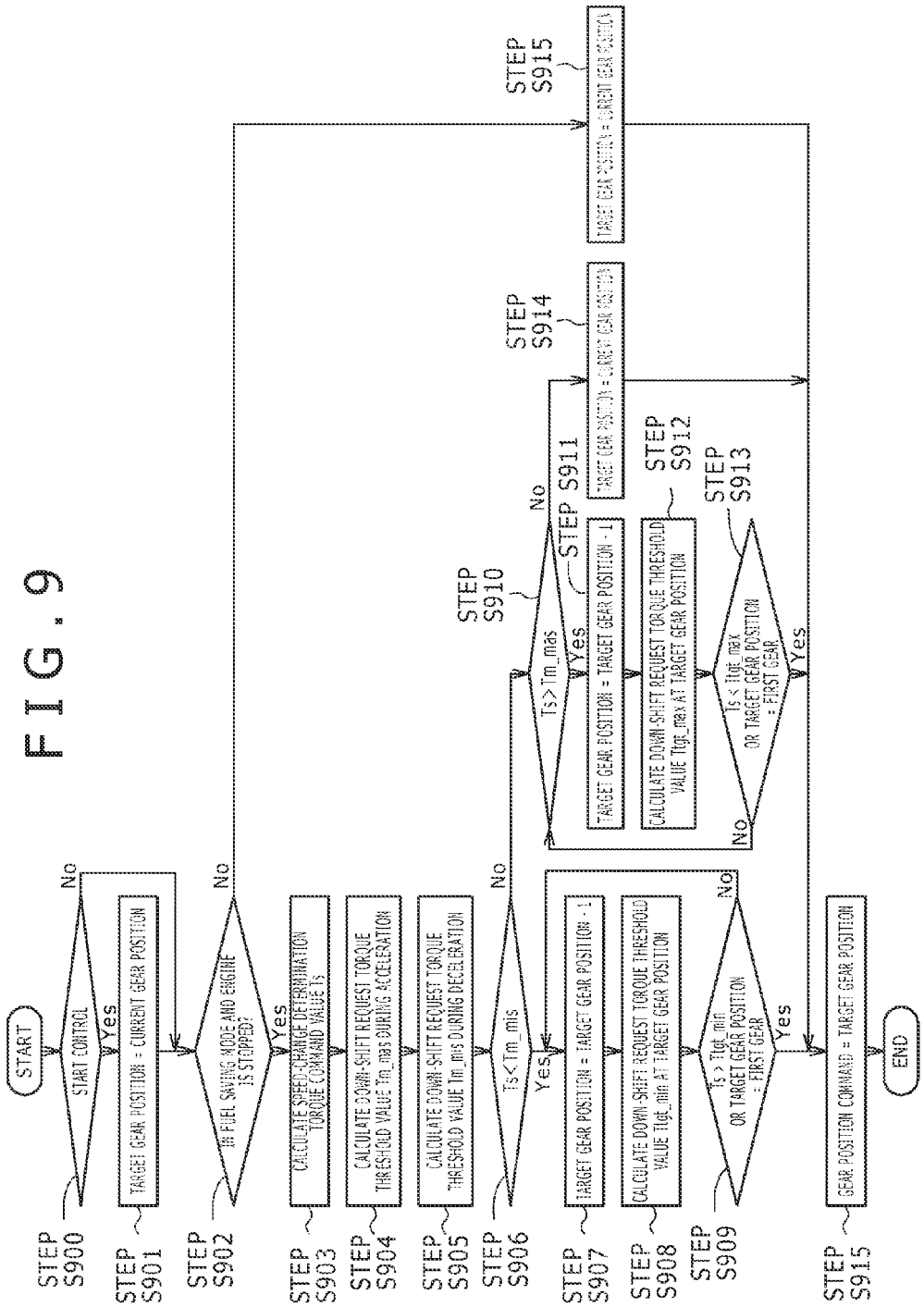
FIG. 9 is a flow chart of the down-shift request decision processing of the third embodiment for the travel control apparatus of the present invention.

FIG. 9 is a flow chart of the down-shift request decision process.

First of all, the target gear position is reset at the current position during the start of travel control in step S900, S901.

Next, in step S902, a decision is made on whether in fuel saving mode and also whether operating with the engine stopped, and if in fuel saying mode and the engine is stopped, and the speed-change torque command value Ts is calculated in step S903 by using Formula 3 and using the acceleration command value Acmd 211.

Next, in step S904 and step S905, the down-shift request torque threshold value Tm_mas during acceleration and the down-shift request torque threshold value Tm_mis during deceleration are calculated by using the formulas 4, 5.

Next, in step S906, the speed-change torque command value Ts and the down-shift request torque threshold value Tm_mis during deceleration are compared, and when Ts is smaller than Tm_mis the target gear position is lowered one step (step S907), the down-shift request torque threshold value Ttgt_min at the target gear position is calculated by utilizing formula 5 (step S908), the Ts and Ttgt_min are further compared in step S909, and when Ts is larger than Ttgt_min or the target gear position is first gear, the target gear position is set to the gear position command value (step S915).

In step S909 on the other hand, when the Ts is smaller than Ttgt_min the step S907 and the step S908 are repeatedly performed.

In step S906, when the speed-change torque command value Ts is larger than the down-shift request torque threshold value Tm_mis during deceleration, the processing shifts to step S910, when the speed-change torque command value Ts is larger than the down-shift request torque threshold value Tm_mas during acceleration, the target gear position is lowered one step (step S911), the down-shift request torque threshold Ttgt_max at the target gear position is calculated by using formula 4 (step S912), Ts and Ttgt_max are compared in step S913, and when the Ts is smaller than the Ttgt_max or when the target gear position is first gear, the target gear position is set to the gear position command value (step S915).

In step S913, when Ts is larger than Ttgt_max, the step S911 and the step S912 are repeatedly performed.

In step S910, when the speed-change torque command value Ts is smaller than the down-shift request torque threshold value Tm_mas during acceleration, the target gear position is set as the current gear position since a speed change is not needed.

In step S902, when not in fuel saving mode and the engine is operating, there is no need for a speed change so the current gear position is set as the target gear position.

The operation of the speed-change command value computing unit 206 is described next.

<Operation of the Speed-Change Command Value Computing Unit>

FIG. 10(a) shows the operation during deceleration.

The control starts at time td0, and the target gear position is reset to the current gear position.

In the figure, Tmin is a value which is the motor output lower-limit torque Tm_min 209 that is converted to the transmission end torque by utilizing formula 1, and that value added with a specified offset is Tm_mis.

In the deceleration during travel control, the speed-change torque command value Ts gradually becomes smaller, Ts<Tm_mis at time td1, and the target gear position is calculated.

The transmission speed changes at time td2, and Tm_mis becomes smaller as the gear moves lower so that Ts>Tm_mis.

FIG. 10(b) is a drawing showing the operation during acceleration.

The control starts at time td0, and the target gear position is reset to the current gear position.

In the figure, Tmax is a value which is the motor output upper-limit torque Tm_max 207 that is converted into the transmission end torque by utilizing the formula 1, and that value added with a specified offset is Tm_mas.

In the acceleration during travel control, the speed-change torque command value Ts gradually becomes larger, Ts>Tm_mas at time ta1, and the target gear position is calculated.

The transmission speed changes at time ta2, and Tm_mas becomes larger as the gear moves lower so that Ts<Tm_mas.

After calculating the target gear position, the target gear position and the current gear position are compared, and when the target gear position is smaller than the current gear position, the down-shift request signal sets to ON, and when the target gear position is larger than the current gear position, the down-shift request signal may be set to OFF.

The present embodiment is capable of performing the travel control that outputs the gear position command value to the integrated control unit, suppresses the fuel consumption, and increases the energy recovery amount.

Fourth Embodiment of the Travel Control Apparatus

The travel control apparatus of the third embodiment outputs a down-shift request signal and gear position command value to perform down-shift control when the acceleration or deceleration is inadequate. However, the travel control apparatus of the present embodiment performs control by outputting a gear ratio in the speed-change command value computing unit 206.

The transmission control unit 113 is structured to change the speed in this gear ratio a gear ratio signal is received from the travel control unit.

Next, the processing flow for finding the gear position command value is described below.

<Processing Flow for Finding the Gear Position Command Value>

Figure 11:
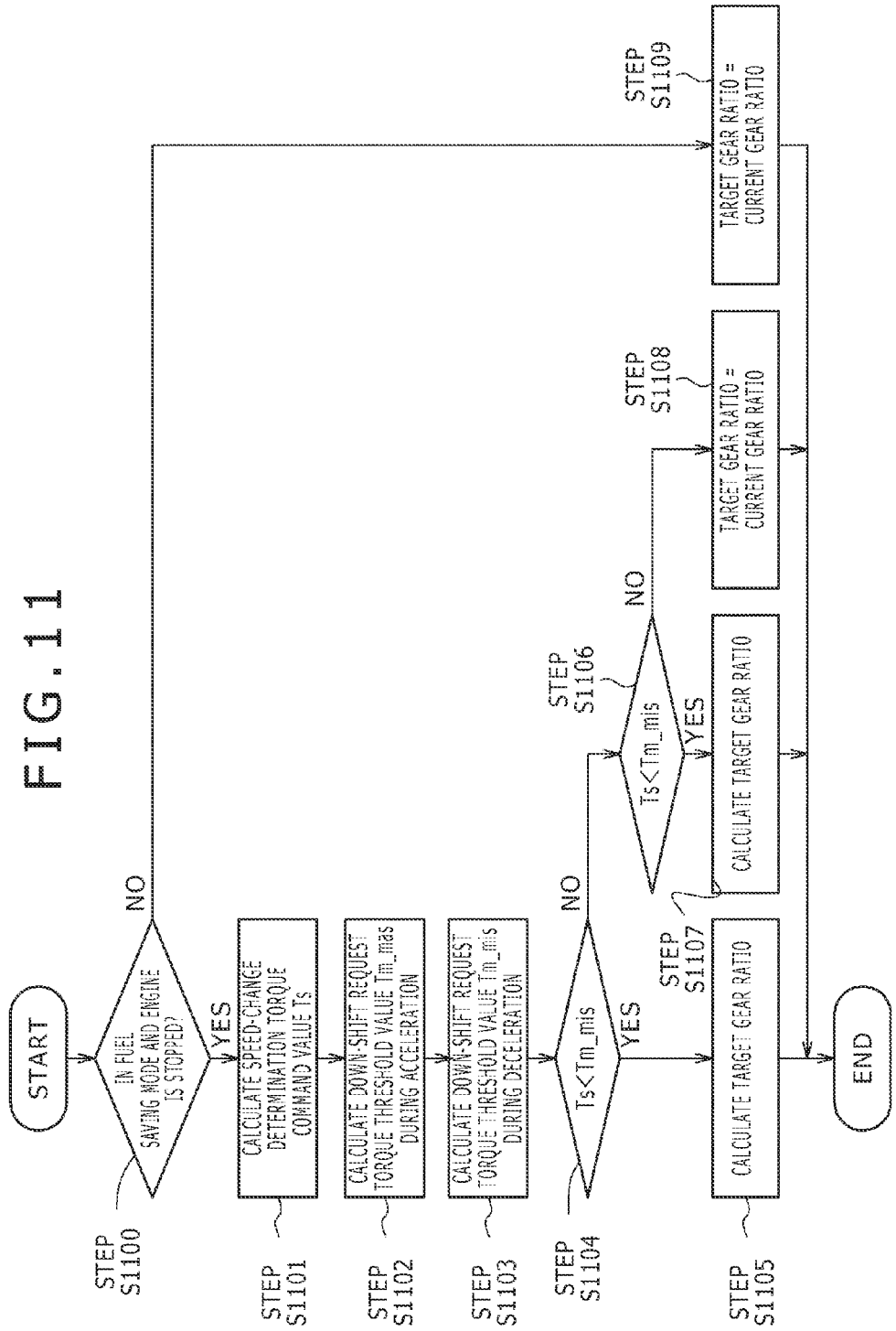
FIG. 11 is a flow chart of the down-shift request decision processing of the fourth embodiment for the travel control apparatus of the present invention.

FIG. 11 is a flow chart of the down-shift request decision processing.

First of all, in step S1100, a decision is made on whether or not in fuel saving mode and also whether the engine is stopped, and when in fuel saving mode and also that the engine is stopped, the speed-change torque command value Ts is calculated by utilizing the acceleration command value Acmd 211 and by using formula 3 in step S1101.

The down-shift request torque threshold value Tm_mas during acceleration, and the down-shift request torque threshold value Tm_mis during deceleration are respectively calculated by utilizing the formulas 4, 5 in step S1102 and step S1103.

Next, in step S1104, the speed-change torque command value Ts and the down-shift request torque threshold value Tm_mis during deceleration are compared, and when the Ts is smaller than Tm_mis, the target gear ratio is calculated.

The target gear ratio is found as shown in the following formula 6 by the value Tmin so that the speed-change torque command value Ts and the motor lower-limit torque are converted into the transmission end torque (step S1105).

$$\text{Target gear ratio} = Ts/Tmin \qquad \text{[Formula 6]}$$

In step S1104, the process proceeds to step S1106 when Ts is larger than Tm_mis, the speed-change torque command value Ts and the down-shift request torque threshold value Tm_mis during acceleration are compared, and the target gear ratio further calculated when Ts is smaller than Tm_mis.

The target gear ratio is found as shown in the following formula 7 by converting the speed-change torque value Ts and the motor upper-limit torque into a value Tmin converted to the transmission end torque value (step S1107).

$$\text{Target gear ratio} = Ts/Tmas \qquad \text{[Formula 7]}$$

In step S1106, the current gear ratio is substituted into the target gear ratio when Ts is larger than Tm_mis (step S1108).

In step S1100, when not in fuel saving mode or when the engine is operating the current gear ratio is set as the target gear ratio.

Next, the operation of the speed-change command value computing unit 206 is described below.

<Operation of the Speed-Change Command Value Computing Unit>

FIG. 12(a) is a drawing showing the operation during deceleration.

In the figure, Tmin is a value which is the motor output lower-limit torque Tm_min 209 that is converted into the transmission end torque by utilizing the formula 1, and that value added with a specified offset is Tm_mis.

In the deceleration during travel control, the speed-change torque command value Ts gradually becomes smaller, Ts<Tm_mis at time td1, and the target gear ratio is calculated.

The transmission speed changes at time td2, and Tm_mis becomes small as the gear ratio increases so that Ts>Tm_mis.

FIG. 12(b) is a drawing showing the operation during acceleration.

In the figure, Tmax is a value which is the motor output upper limit torque Tm_max 207 that is converted into the transmission end torque by utilizing formula 1, and that value added with a specified offset is Tm_mas.

In the acceleration during travel control, the speed-change torque command value Ts gradually becomes larger, Ts>Tm_mas at time ta1, and the target gear ratio is calculated.

The transmission speed changes at time ta2, and Tm_mas becomes larger as the gear ratio moves lower so that Ts<Tm_mas.

After calculating the target gear ratio, the target gear ratio and the current gear ratio are compared, and when the target gear ratio is larger than the current gear ratio, the down-shift request signal may be set to ON, and when the target gear ratio is smaller than the current gear position, the down-shift request signal may be set to OFF.

The present embodiment is capable of performing travel control that outputs the gear ratio to the integrated control unit, suppresses fuel consumption, and increases the energy recovery amount.

LIST OF REFERENCE SIGNS 100,100A Travel control unit (Travel control apparatus)
101 Vehicle speed sensor
102 Steering SW
103 Exterior sensor
104 Navigation device
105 Integrated control unit
200 Target vehicle speed computing unit
201 Acceleration command value calculation unit
202 Acceleration upper-limit value calculation unit
203 Acceleration limit processing unit
204 Acceleration lower-limit value calculation unit
205 Torque command value computing unit
206 Speed-change command value computing unit

The invention claimed is:

1. A vehicle travel control apparatus that is mounted in a hybrid vehicle utilizing an engine and a motor as power sources and controls its own vehicle speed, the vehicle travel control apparatus comprising:
a target vehicle speed computing unit that calculates a target vehicle speed;
an acceleration command value calculation unit that calculates an acceleration command value based on the target vehicle speed;
an acceleration limit processing unit that calculates a post-limit acceleration command value by limiting the acceleration command value by utilizing a specified acceleration upper-limit value and a specified acceleration lower-limit value;
a torque command value computing unit that calculates a torque command value from the post-limit acceleration command value; and
a speed-change command value computing unit that determines whether a down-shift is required or not based on the acceleration command value and an upper-limit torque or a lower-limit torque of the motor, and calculates a speed-change command value, wherein
while the engine is operating, the acceleration upper-limit value is calculated based on a torque that is generated by a combined action of the engine and the motor; and
while the engine is not operating, the acceleration upper-limit value is calculated based on at least one of the upper-limit torque value of the motor and the lower-limit torque value of the motor.

2. The vehicle travel control apparatus according to claim 1, wherein the acceleration upper-limit value is also calculated based on a battery charge state.

3. The vehicle travel control apparatus according to claim 1, wherein when the acceleration based on the lower-limit torque of the motor is larger than a specified value, control is performed to expend the electrical power of the battery, and obtain regenerative deceleration while decelerating.

4. The vehicle travel control apparatus according to claim 1, wherein when the acceleration based on the upper-limit torque of the motor is smaller than a specified value, control is performed to start the engine and obtain acceleration.

5. The vehicle travel control apparatus according to claim 1, wherein the speed-change command value computing unit calculates a gear position command value serving as a target gear position, as the speed-change command value.

6. The vehicle travel control apparatus according to claim 1, wherein the speed-change command value computing unit calculates a target gear ratio as the speed-change command value.

* * * * *